(12) United States Patent
Cornwell et al.

(10) Patent No.: US 8,060,690 B1
(45) Date of Patent: *Nov. 15, 2011

(54) CONTROLLING MEMORY OPERATIONS USING A DRIVER AND FLASH MEMORY TYPE TABLES

(75) Inventors: Michael J. Cornwell, San Jose, CA (US); Christopher P. Dudte, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/985,908

(22) Filed: Jan. 6, 2011

Related U.S. Application Data (63) Continuation of application No. 11/739,817, filed on Apr. 25, 2007, now Pat. No. 7,870,327.

(51) Int. Cl.
*G06F 13/16* (2006.01)
(52) U.S. Cl. .................. 711/103; 711/154; 719/327
(58) Field of Classification Search .................. 711/103, 711/154
See application file for complete search history.

(56) References Cited

U.S. PATENT DOCUMENTS

| | | |
|---|---|---|
| 5,602,987 A | 2/1997 | Harari et al. |
| 5,671,229 A | 9/1997 | Harari et al. |
| 5,719,808 A | 2/1998 | Harari et al. |
| 6,081,850 A | 6/2000 | Garney |
| 6,149,316 A | 11/2000 | Harari et al. |
| 6,173,374 B1 | 1/2001 | Heil et al. |
| 6,330,806 B1 | 12/2001 | Beaverson et al. |
| 6,426,893 B1 | 7/2002 | Conley et al. |
| 6,721,820 B2 | 4/2004 | Zilberman et al. |
| 6,757,842 B2 | 6/2004 | Harari et al. |
| 6,763,424 B2 | 7/2004 | Conley |
| 6,914,846 B2 | 7/2005 | Harari et al. |
| 6,947,332 B2 | 9/2005 | Wallace et al. |
| 7,137,011 B1 | 11/2006 | Harari et al. |
| 7,162,569 B2 | 1/2007 | Conley et al. |
| 7,237,046 B2 | 6/2007 | Paley et al. |
| 7,237,074 B2 | 6/2007 | Guterman et al. |
| 7,240,219 B2 | 7/2007 | Teicher et al. |
| 7,426,143 B2 | 9/2008 | Kim et al. |
| 2002/0049888 A1 | 4/2002 | Hertwig et al. |
| 2002/0114187 A1 | 8/2002 | Choi et al. |
| 2003/0163630 A1 | 8/2003 | Aasheim et al. |
| 2003/0172261 A1 | 9/2003 | Lee et al. |
| 2004/0230738 A1 | 11/2004 | Lim et al. |
| 2007/0028082 A1 | 2/2007 | Lien |

OTHER PUBLICATIONS

International Search Report and Written Opinion of the International Searching Authority issued in PCT/US2007/075789, Feb. 6, 2008, 14 pages.
International Preliminary Report on Patentability issued in PCT/US2007/075789, Mar. 17, 2009, 9 pages.

*Primary Examiner* — Hetul Patel
(74) *Attorney, Agent, or Firm* — Fish & Richardson P.C.

(57) ABSTRACT

Systems and processes may include a first memory and a second memory. A driver and/or an application may be stored in the first memory. Flash memory type data of the first memory may be stored in the second memory. The driver may control the first memory at least partially based on the flash memory type data. The first memory may be exchanged for a third memory. The driver may be stored on the third memory. The flash memory type data for the third memory may be stored on the second memory.

17 Claims, 6 Drawing Sheets

CONTROLLING MEMORY OPERATIONS USING A DRIVER AND FLASH MEMORY TYPE TABLES

CROSS-REFERENCE TO RELATED APPLICATION

This application is a continuation of U.S. application Ser. No. 11/739,817, filed on Apr. 25, 2007, which is incorporated herein by reference.

TECHNICAL FIELD

The present invention relates to systems and processes for accessing data, and more particularly to using flash type tables with flash drivers to access data on a memory.

BACKGROUND

Currently, access to a memory is controlled by a driver. The driver allows the memory controller and/or processor to read and/or write data to the memory. Drivers may be specific to the type, brand, and/or size of the memory used by a device, and thus, different drivers must be used for different memories.

SUMMARY

Memories of devices may be accessed and/or controlled using a driver and flash memory type data. Flash memory type data may be separated from a driver so that a driver may be used with a variety of different types of memory. The driver may access the flash memory type data to determine information specific to the memory being accessed.

Because memory technology is constantly changing, using newer forms of memory may provide increased performance, storage capacity, longer lifecycles of use, and/or lower production costs. However, using new memory in a device may require modifications to the device drivers and often to operating systems. Even changing sources for memories (e.g., brand), such as flash memories, may require modifications to drivers and operating systems. Thus, advantages in switching memory may be outweighed if drivers and applications must be reprogrammed and/or modified. However, if a driver with a separate flash memory type data is utilized, flash memory type data may be modified when using a different memory rather than reprogramming and/or modifying drivers and other applications.

In one general aspect, a driver for a first memory is stored in the first memory, and flash memory type data for the first memory is stored in a second memory. The first memory is a flash memory and allows sequential access to data stored on the first memory. The second memory is independently accessible from the first memory. The second memory allows random access to data stored on the second memory. The driver on the first memory is operable to control the first memory based at least partially on the flash memory type data.

Implementations may include one or more of the following features. Flash memory type data may include a manufacturer of the first memory, a size of the first memory, and/or a timing of the first memory. The first memory may be NAND flash memory. The second memory may be NOR flash memory. An operating application for a host may be stored in the first memory. The host may include the first memory and the second memory. A software application on the first memory may be executed using the driver stored on the first memory. The first memory may be exchanged with a third memory and flash memory type data for the third memory may be stored in the second memory.

In another general aspect, a driver stored in a first memory is accessed, and flash memory type data for the first memory is accessed from a second memory. A flash memory type of the first memory is determined based on the flash memory type data, and data on the first memory is accessed using the driver. The driver controls the first memory at least partially based on the determined flash memory type.

Implementations may include one or more of the following features. An application stored in the first memory may be accessed and/or executed using the driver. Flash memory type data for a third memory may be accessed and a third memory may be operated using the driver stored in the first memory and the flash memory type data for the third memory. A first memory may be replaced with a third memory. Flash memory type data for the third memory may be stored in the second memory. An appropriate voltage for the first memory may be determined based on the flash memory type data. A timing for the first memory may be determined based on the flash memory type data. A number of blocks in the first memory may be determined based on the flash memory type data.

In another general aspect, a first memory is a flash memory that allows sequential access to data stored on the first memory, and a second memory is independently accessible from the first memory. The second memory includes a flash memory that allows random access to data stored on the second memory. The flash memory type data for the first memory is stored in the second memory, and a driver to control the first memory based at least partially on the flash memory type data is stored on the first memory.

Implementations may include one or more of the following features. A third memory may have associated flash memory type data. The driver may control the third memory based at least partially on the flash memory type data for the third memory. An application may be stored in the first memory.

The details of one or more implementations are set forth in the accompanying drawings and the description below. Other features will be apparent from the description, the drawings, and from the claims.

DESCRIPTION OF DRAWINGS

Like reference symbols in the various drawings indicate like elements.

DETAILED DESCRIPTION

Figure 1:
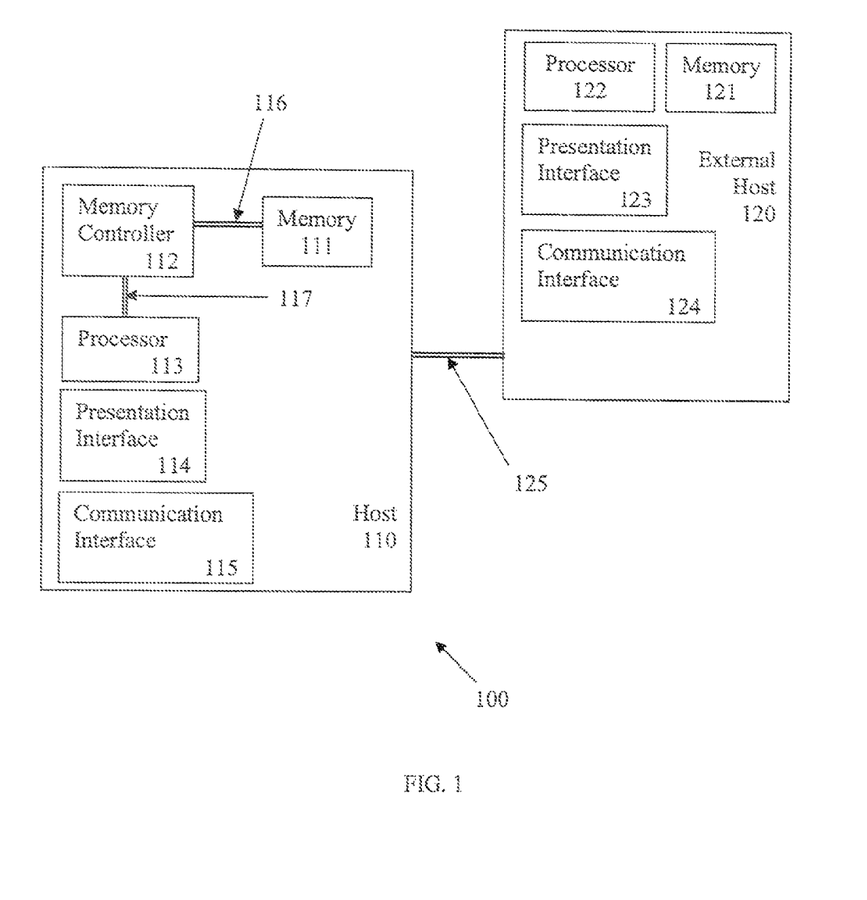
FIG. 1 illustrates an example of a host and an external host.

FIG. 1 illustrates an example system 100. System 100 may include a host 110. Host 110 may be any electronic or computing device that uses nonvolatile memory including, for example, portable and desktop computers, clients, servers, consumer electronics, calculators, network appliances, media players/recorders, game consoles, mobile phones, email devices, personal digital assistants (PDAs), embedded devices, televisions, system-on-chip (SoC), set-top boxes, audio recorders, handheld data collection scanners, and/or monitoring devices. Host 110 may include a memory 111, a memory controller 112, a processor 113, a presentation interface 114, and/or a communication interface 115. Memory controller 112 and/or processor 113 may include individual chips, a chip set, or can be integrated together on a single chip (e.g., a SoC solution).

Memory 111 may be nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), phase-change memory (PRAM), and/or any other memory that does not need its memory contents periodically refreshed and/or can retain information without power. Memory 111 may include memory chips or memory modules (e.g., single in-line memory modules (SIMMs) or dual in-line memory modules (DIMMs)). In some implementations, memory 111 may be electrically erasable. Memory 111 may have a finite number of write/erase cycles. For example, after a number of write/erase cycles, the ability of a cell of memory 111 to maintain a specified charge may be impaired. For example, a memory cell may leak electrons. As another example, an electric charge may not be substantially removable from a memory cell. Cells of a nonvolatile memory may not be individually erasable, such as in flash memory. For example, a cell of a block may be erased by erasing the entire block in which the cell resides. Similarly, writing new data to a portion of a block may require erasing the entire block and rewriting any unchanged portions of the block along with the new data.

Figure 2:
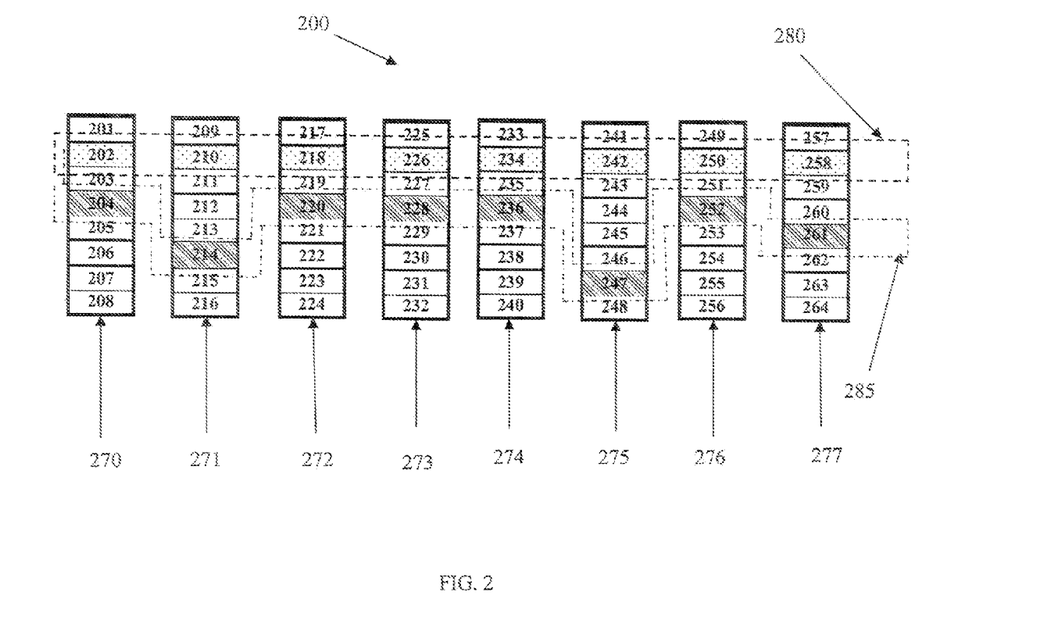
FIG. 2 illustrates an example configuration of a memory.

In some implementations, memory may be interleaved to increase performance of the host. FIG. 2 depicts a representation of a portion of a memory 200. Memory 200 may include physical blocks 270-277. Each physical block 270-277 may include cells 201-264. For example, physical block 270 may include cells 201-208 and physical block 271 may include cells 209-216. The physical blocks 270-277 and cells 201-264 depicted in FIG. 2 are for purposes of illustration and do not represent a typical implementation. For example, in the case of flash memory, physical blocks typically include a much larger number of cells (e.g., sufficient to store 512 or 2048 bytes), which may be divided into pages (e.g., of 64 bytes), although any size of physical blocks and any number of cells can be used.

During operation, memory 111 may receive signals from memory controller 112 over Input/Output (I/O) bus 116, which enables memory 111 to carry out memory access requests (e.g., read or write operations) received by the memory controller 112 from the processor 113 (see FIG. 1). Memory 111 may be interleaved, so that read or write requests to logical block addresses 280 and 285 (LBAs) are mapped to physical memory addresses that include two or more physical blocks 270-277 (see FIGS. 1 and 2). Interleaving may increase performance (e.g., by decreasing read and/or write times by allowing multiple parallel reads or writes) or protecting against lost data (e.g., by providing some degree of redundancy across different physical blocks) of memory 111. Host 110 (e.g., using processor 113) may perform reads and writes to LBAs 280, 285, which are mapped or translated (e.g., by memory controller 112) to physical block addresses 270-277 of memory. For example, LBA 280 includes cells 202, 210, 218, 226, 234, 242, 250, and 258 and LBA 285 includes cells 204, 214, 220, 228, 236, 247, 252, and 261. In some situations, mapping may help make a memory appear similar to a hard disk drive to the host (e.g., to the operating system of the processor).

In some implementations, physical blocks may be mapped to virtual blocks. Virtual blocks may make a memory appear continuous. For example, bad blocks may be omitted from a virtual block listing. Virtual blocks may be mapped to LBAs to increase memory performance by allowing interleaving.

Memory controller 112 may be any device that manages memory access including, for example, programmable memory controllers, flash disk controllers, direct memory access (DMA) controllers, logic devices, field-programmable gate arrays (FPGAs), and/or central processing units (CPUs). Examples of memory controller 112 may include the family of ATA Flash Disk Controllers (e.g., device nos. SST55LD019A, SST55LD019B, SST55LD019C, etc.), manufactured by Silicon Storage Technology, Inc. (Sunnyvale, Calif.). In some implementations, memory controller 104 supports single-level cell (SLC) and/or multi-level cell (MLC) flash media.

In some implementations, memory controller 112 may recognize control, address, and/or data signals transmitted on bus 117 by processor 113. Memory controller 112 may translate the control, address, and/or data signals into memory access requests on memory 111. Bus 117 may be an Integrated Drive Electronics (IDE)/Advanced Technology Attachment (ATA) bus that transfers control, address and data signals using IDE/ATA standard bus protocol (e.g., ATA-6 bus protocol). IDE/ATA signals may be generated by processor 113 and translated by the memory controller 112 into memory access requests in a format or protocol appropriate for communicating with the memory 111 across bus 116.

Processor 113 may include a programmable logic device, a microprocessor, or any other appropriate device for manipulating information in a logical manner. A processor may execute the operating system for the host. An example of processor 113 is a PP5002 Superintegration™ SoC controller manufactured by PortalPlayer, Inc. (San Jose, Calif.). The PP5002 controller may provide a platform for media player/recorder systems and/or other products that use non-volatile memory.

During use, an application running on processor 113 may request access to data stored on memory 111, see FIG. 1. For example, a user of a host 110 (e.g., a media player/recorder) or an external host 120 (e.g., a desktop or laptop computer) connected to the host 110 may submit a request to save a song to memory 111. A media player/recorder application may send the request to an operating system running on the processor 113, which formats the request into IDE/ATA signals. IDE/ATA signals may be transmitted to memory controller 112 on bus 117 by processor 113. Memory controller 112 may translate the request to access memory 111 via bus 116.

In some implementations, processor 113 may include memory controller 112. For example, the processor 113 and memory controller 112 may be an integrated processor unit. Processors with integrated memory controllers may be commercially available from Freescale Semiconductor (Austin, Tex.) and Texas Instruments (Dallas, Tex.). Utilizing an integrated processor 113 and memory controller 112 may decrease production cost of host 110, facilitate manufacture of host 110, and/or make process execution more efficient. For example, utilizing a single processor/memory controller decreases the number of steps in fabrication.

Presentation interface 114 may present data such as videos, music, messages from the host 105 and/or external host 120, graphical interface for various applications stored on the host (e.g., graphical interface for playing music, videos, manipulating data, etc). For example, presentation interface 114 may present data in visual and/or audio format. Presentation interface 114 may include display device, such as a screen, and/or speakers. Presentation interface may include a graphical interface.

Communication interface 115 may allow communication with other devices. Communication interface 115 may transmit data from host 110 to, and/or receive data from, external host 120 via network protocols (e.g., TCP/IP, Bluetooth, and/or Wi-Fi) and/or a bus (e.g., serial, parallel, USB, and/or FireWire).

Figure 3:
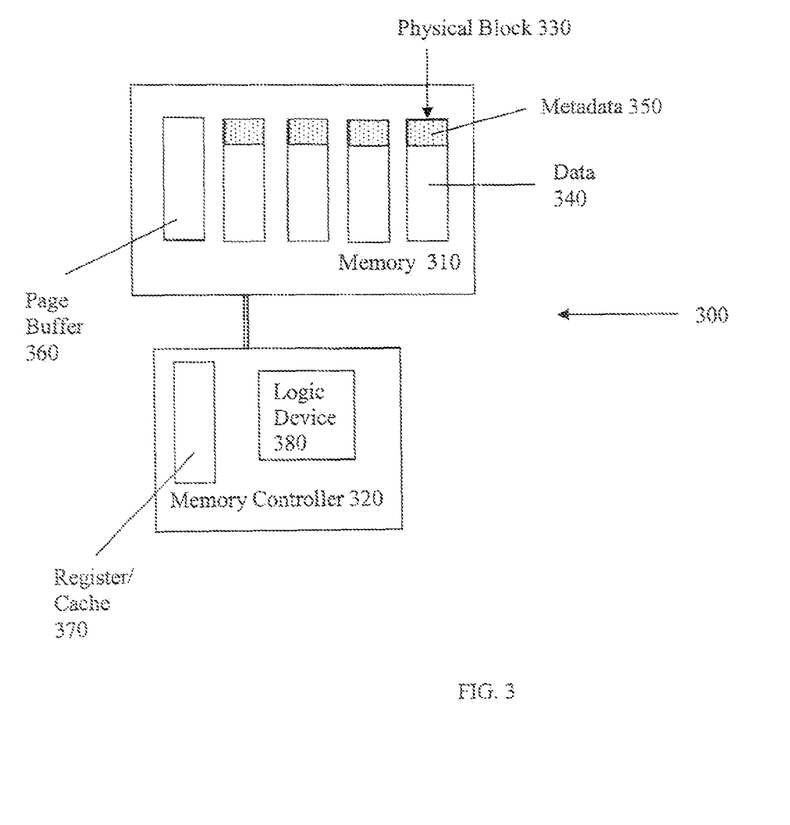
FIG. 3 illustrates an example of a memory controller coupled to a memory.

FIG. 3 illustrates a portion 300 of a host including a memory 310 and a memory controller 320. Memory 310 may include physical blocks 330 that store data 340 or are capable of storing data. A portion of a physical block 330 may store metadata 350. Metadata may include information about other data in the memory, such as listings of bad blocks in a memory or error correcting codes. Memory 310 may include a first buffer 360 (e.g., a page buffer) that is used to temporarily store data as it is being written to or read from the blocks 330. Memory controller 320 may include or be coupled to a second buffer 370 (e.g., a register or a cache). Second buffer 370 may be a volatile memory such as RAM or a nonvolatile memory such as flash memory.

Memory controller 320 may include a logic device 380 that interprets operations from a host or external host and/or performs operations on a coupled memory. Memory controller 320 operations may include use of at least two buffers 360 and 370 to facilitate operations (e.g., read or write), facilitate random data access operations, and/or increase performance. For example, memory controller 320 may read data from memory 310. In response to a read request from memory controller 320, data from data portion 340 of memory 310 may be loaded into first buffer 360 (e.g., data register or page register). The data in the first buffer 360 may be transmitted to second buffer 370 (e.g., cache, register, or cache register) which is coupled to memory controller 320. The second buffer 370 may accumulate multiple pages of data from the first buffer. Memory controller 320 may reformat data from second buffer 370 for delivery to processor 113 of the host 110 (see FIG. 1) (e.g., in IDE/ATA format). While or after data is transferred from first buffer 360 to second buffer 370, additional data may be loaded from data portions 340 of memory 310 to the first buffer 360.

Memory controller 320 may also input data received from a host or external host into second buffer 370 (e.g., cache) for programming of the array through first buffer 360.

The memory controller 320 may receive requests to read and/or write data to memory 310. The memory controller 320 may format the requests to an instruction format appropriate for the memory 310 (e.g., from or to IDE/ATA format). The memory controller 320 may then transfer the instructions in the appropriate format to the memory 310. The requests in the memory 310 may then be converted to the appropriate electrical charges or the appropriate portions of the memory may be transferred to the second buffer.

Although the above description discusses portions of each block as being for data and/or for metadata, portions of a block that are used for data or metadata may not be fixed. A particular portion of a block may include metadata at some times and include user data or other data at other times.

Host 110 may be coupled to an external host 120, as illustrated in FIG. 1, to transmit and/or receive data. For example, songs and/or videos may be downloaded from external host 120 (e.g., computer) to host 110, which may be a media player or other portable device. As another example, applications, such as firmware, operating systems, software for playing MP3s, software for playing videos and/or upgrades, updates, and/or modifications to applications (e.g., change in available features such as playlists) may be downloaded from external host 120 to host 110. Furthermore, data from the host 110 may be uploaded to external host 120. In addition, host 110 may be coupled to external host 120 to modify data on memory 111 of the host and/or memory 121 of the external host. Host 110 may be coupled to external host 120 to initiate and/or execute processes on the host.

Host 110 may be temporarily coupled to external host. For example, host 110 may be coupled to external host 120 using a connector 125 (e.g., serial bus, parallel bus, USB, and/or FireWire). Connector 125 may be an electrical connector. Connector 125 may allow a removable connection between host 110 and external host 120. A temporary coupling between host 110 and external host 120 may allow the host, such as a portable device, to be disconnected from the external host and/or physically moved away from the external host.

Host 110 may be wirelessly coupled to external host 120. Data may be transmitted using one or more network protocols (e.g., TCP/IP, Wi-Fi, 802.11g, 802.11n, IR or Bluetooth).

External host 120 may be any electronic or computing device including, for example, portable and desktop computers, clients, servers, consumer electronics, network appliances, etc. An external host 120 may include a memory 121, a processor 122, a presentation interface 123, and/or a communication interface 124.

Memory 121 may be a volatile memory (e.g., RAM) and/or nonvolatile memory (disk drive, flash memory, or other suitable memories). Processor 122 may be a programmable logic device, a microprocessor, or any other appropriate device for manipulating information in a logical manner. Presentation interface 123 may present data. Communication interface 124 may allow communication with other devices, such as host 110.

Figure 4:
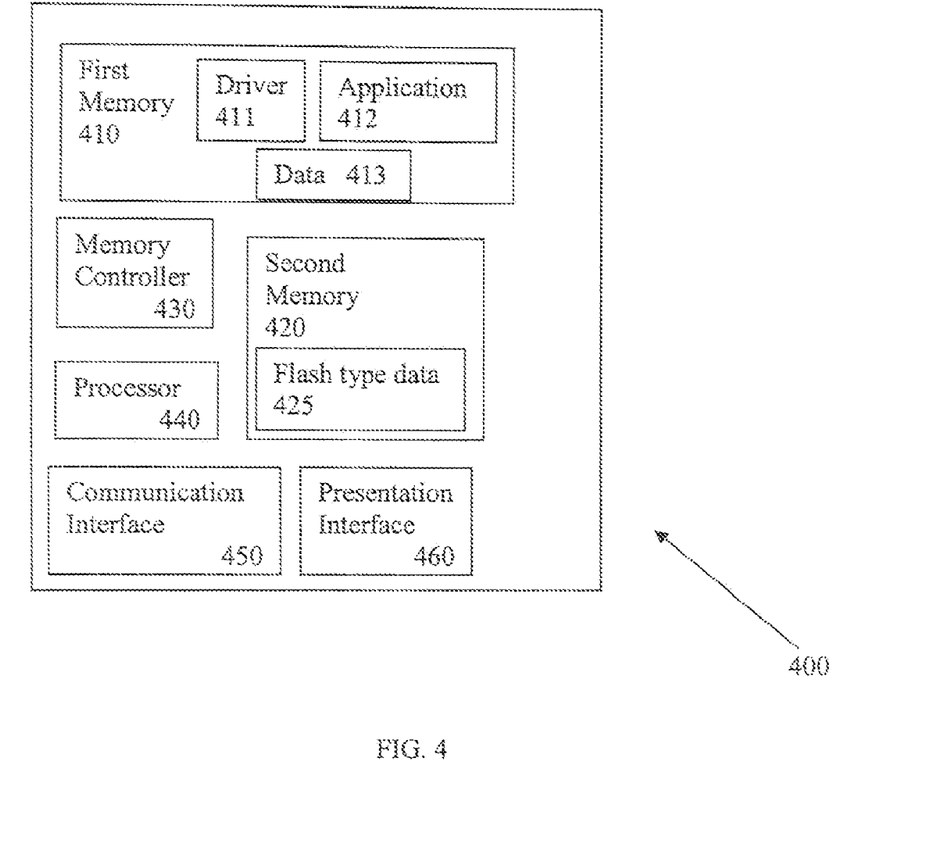
FIG. 4 illustrates an example host.

FIG. 4 illustrates an example host device 400. Host 400 may be a portable device such as a media player or a PDA. Host may include memories 410 and 420, memory controller 430, processor 440, communication interface 450, and a presentation interface 460. Memories 410 and 420 may be nonvolatile memories. For example, first memory 410 may be a NAND flash memory and/or second memory 420 may be a NOR flash memory. Memory controller 430 and processor 440 may include a programmable logic device, a microprocessor, or any other appropriate device for manipulating information in a logical manner. Communication interface 450 may allow communication with other devices. Presentation interface 460 may present data visually, audibly, tactilely, and/or otherwise to a user.

First memory 410 may include a driver 411 and a software application 412. Driver 411 may be operable to control first memory 410. Software application 412 may include an operating application (e.g., Windows, OS 2, or Linux) configured to control the host 400 or other software (e.g., a program that enables the host to perform one or more tasks such as an application to play media). In some implementations, driver 411 may be incorporated in or a portion of operating application 412. Incorporating driver 411 into, or associating the driver 411 with, an operating application 412 may facilitate manufacture of a host 400. Incorporating a driver 411 into an operating application 412 may allow a universal operating application to be used with hosts 400 with a variety of different memories (e.g., types and/or brands). Using a universal operating application 412 and driver 411 may allow hosts 400 to be modified to incorporate new technology and/or less expensive memory options. In addition, using a universal operating system may allow greater flexibility in manufacture of hosts since a variety of different types of memories may be used without changing the operating application and/or the driver.

Second memory 420 may include flash memory type data 425 for first memory 410. Flash memory type data 425 may be used by the driver 411 to operate first memory 410. Flash memory type data 425 may be a table. Flash memory type data 425 may include identifying information about first memory 410 such as memory size, memory type, memory brand, byte and/or word configuration, block configuration, block sizes, number of blocks, voltage, timings (e.g., operational timings such as when on a phase cycle commands are received), and/or other information that may be utilized by the driver 411 to control the first memory.

Storing the flash memory type data 425 on a separate memory than the driver 411 may facilitate and/or streamline production of the host 400. For example, the universal operating application 412 and/or driver 411 may be stored unchanged on a first memory 410 without considering the type of memory, and the flash memory type data 425 may be modified based on the type of the first memory. Storing flash memory type data 425 on a separate memory may also facilitate production because the image of application 412 and/or driver 411 may be stored on memories without consideration of the type of memory.

First memory 410 may allow sequential access to data stored on the first memory. Second memory 420 may allow random access to data stored on the second memory. Random access to data may allow a processor 440 to more quickly read needed portions of the data when compared to a memory that allows sequential access to data.

In some implementations, first memory 410 may be a NAND flash memory and second memory 420 may be a NOR flash memory. The NAND flash memory may be capable of storing greater amounts of data than the NOR flash memory. The NAND flash memory may store applications, drivers, and/or data while the NOR flash memory may store the flash memory type data for the NAND flash memory. NOR flash memories may allow quicker random access to data than NAND flash memory and may allow execution in place of applications stored on the NOR flash memories. NOR memory may also allow byte wise write capability thus facilitating modifications to the flash memory type data as needed. Data (e.g., from a user or an external host) may be stored on NAND flash memory more efficiently due to the longer program and erase times, and higher costs, of NOR flash memory.

During use, memory controller 430 may access a driver 411 on first memory 410 and flash memory type data 425 to access data 413 on the first memory. Utilizing driver 411 and flash memory type data 425 may allow memory controller 430 to access applications 412 on first memory 410. In some implementations, memory controller 430 may transmit the data 413 via the communications interface 450 (e.g., transmit the data to an external host coupled to the host) and/or present the data on the presentation interface 460 (e.g., as an audio or video stream).

Figure 5:
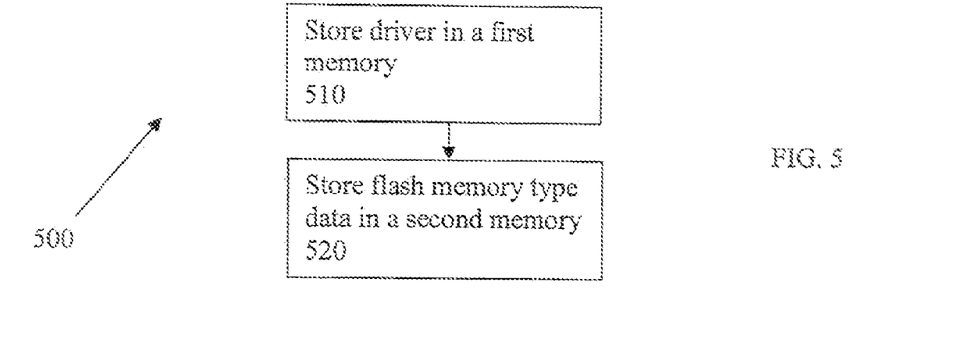
FIG. 5 illustrates an example process for configuring a memory of a host.

FIG. 5 illustrates an example process 500. The driver may be stored on a first memory (operation 510). For example, the driver for a first memory of a host may be stored on the first memory. First memory may be a NAND flash memory. The flash memory type data may be stored in a second memory (operation 520). For example, the flash memory type data for the first memory may be stored in a second memory of the host. Flash memory type data may include the size of the memory (e.g., total size, number of blocks, and/or block size) and/or manufacturer of the memory. The stored driver and the flash memory type data may be used to access data and/or execute applications on the first memory. Storing the driver on a separate memory than the flash memory type data may facilitate fabrication of the host.

Figure 6:
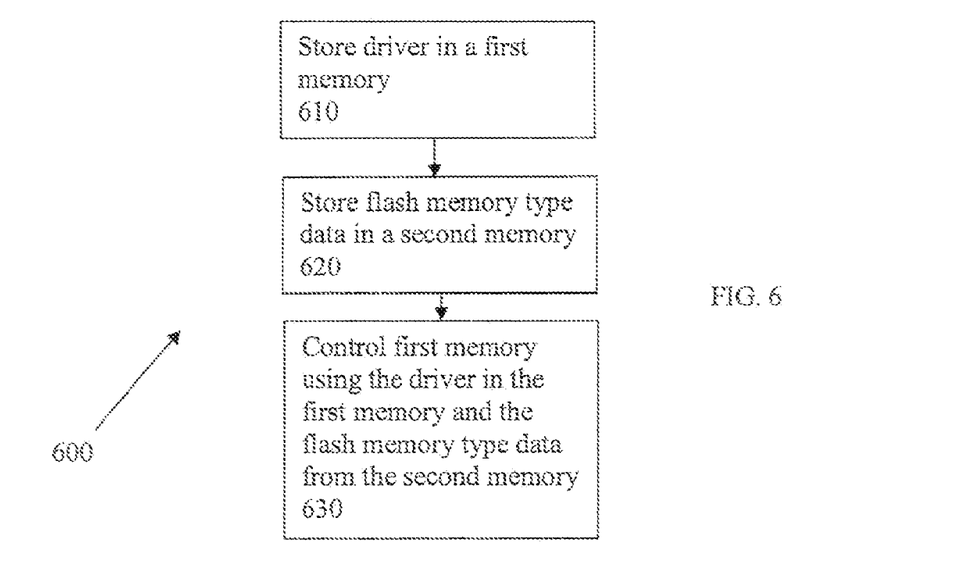
FIG. 6 illustrates an example of a process for configuring a memory of a host.

FIG. 6 illustrates an example process 600 for configuring a memory of the host. The driver for a first memory may be stored in the first memory (operation 610). For example, the driver may allow the memory controller to control the first memory and/or access data stored on the first memory of the host. First memory may be a NAND flash memory.

The flash memory type data may be stored on a second memory of the host (operation 620). For example, the flash memory type data for a first memory may be stored on a second memory of the host.

The first memory may then be controlled using the driver from the first memory and the flash memory type data from the second memory (operation 630). For example, a memory controller or a processor coupled to the first memory and the second memory may access the driver and the flash memory type data to access data stored on the first memory. As another example, a memory controller may use the driver and the flash memory type data to execute an application stored on the first memory.

Figure 7:
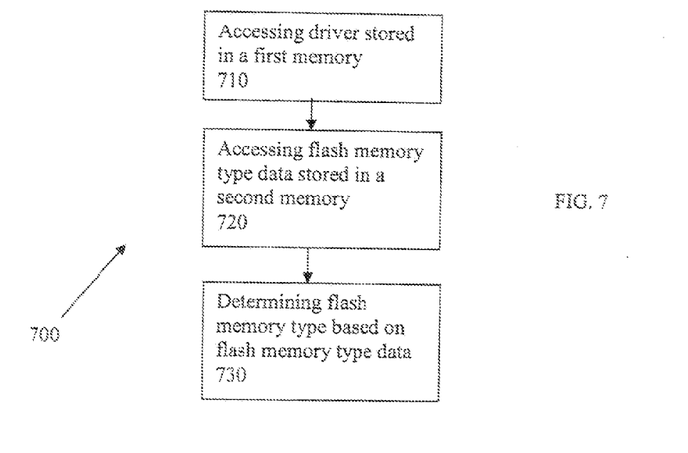
FIG. 7 illustrates an example process of a host.

FIG. 7 illustrates an example process 700 of a host. A driver stored in a first memory may be accessed (operation 710). For example, a processor may access a driver of a first memory from the first memory. As another example, a processor may access a driver from the first memory, where the driver can control multiple types of memories. The first memory may allow sequential access to data.

The flash memory type data stored on a second memory may be accessed (operation 720). For example, the flash memory type data may include the block size of the first memory to allow the driver to access data on the first memory. The second memory may allow random access to data. Random access to data may allow a processor to more quickly read needed portions of the flash memory type data than a memory that allows sequential access to data. For example, a memory controller may need a driver and appropriate voltage to control a memory, and the memory controller may retrieve the appropriate voltage more quickly from a memory that allows random access to data rather than sequential access to data.

Additionally, because access to the flash memory type data for the first memory may be required to access the first memory, a processor may be inhibited from reading the flash memory type data for the first memory if it is stored on the first memory itself. Thus, storing the flash memory type data for a first memory on a separate memory facilitates access to the data on the first memory. In addition, memory technology is rapidly changing, and in order to implement new memory in the systems and processes, as the new memory is developed, a first memory may be replaced with new memory and the existing flash memory type data rather than the driver may be replaced or updated. Requiring replacement of flash memory type data rather than the driver for the memory may reduce manufacturing costs, because less change is required to update or upgrade a system, and/or may increase profitability since products capable of implementing the newest technology may sell better than systems using older technology. Furthermore, storing the flash memory type data in the second memory may facilitate updates in the field or during manufacture, because the first memory may be easily replaced and flash memory type data may be updated in the second memory, rather than replacing the driver for the new first memory.

The first memory type may then be determined from the flash memory type data (operation 730). For example, the appropriate voltage, brand, or configuration may be determined from the flash memory type data. Data on the first memory may then be accessed using the driver and the determined flash memory type.

In some implementations, a memory of a host may be replaced by a different type of memory. For example, if a memory fails, it may be replaced. As another example, if a higher capacity memory is desired, it may be replaced. If newer technology memory is available, it may be replaced. Replacing memory with a newer type of memory may increase performance. Utilizing flash memory type data may allow memory to be replaced without modifying a driver and/or operating application. Flash memory type data may be modified, as needed, instead.

Figure 8:
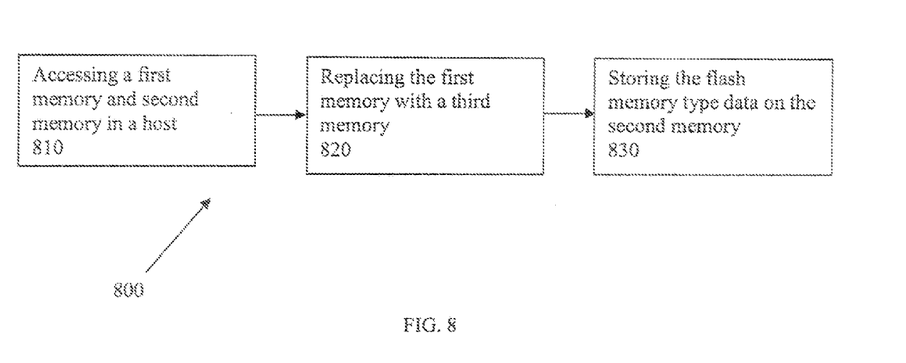
FIG. 8 illustrates an example of replacing a memory of a host.

FIG. 8 illustrates a process 800 for replacing a memory of a host. A first memory and a second memory of a host may be physically accessed (operation 810). For example, a housing of a host may be opened and/or a portion of a housing of a host may be removed. The first memory of the host may be replaced with a third memory (operation 820). For example, a first NAND memory may be replaced with third memory, such as another NAND memory. The flash memory type data of the third memory may be stored on the second memory (operation 830). The flash memory type data of the first memory may be erased and/or the flash memory type data of the third memory may be written to the second memory (e.g., burned to). Alternatively, the second memory may be replaced with a fourth memory that includes the flash memory type data for the third memory.

In some implementations, the host may be a portable media player. A user of the portable media player may desire greater storage capacity and replace the memory in the portable media player. The first memory may be removed from the portable media player and replaced with a third memory. The third memory may be different from the first memory. The third memory may have a larger storage capacity than the first memory. The third memory may include a driver and/or an application. In some implementations, at least a portion of the first memory may be replicated on the third memory. The flash memory type data of the first memory in the second memory may be replaced and/or the flash memory type data of the third memory may be stored in the second memory. The flash memory type data of the first memory may be erased and the flash memory type data of the third memory may be stored (e.g., burned onto) the second memory.

In some implementations, additional memory may be coupled to the portable media player to increase storage capacity. Flash memory type data for the additional memory may be stored in the second or an additional memory. The driver stored on the first memory may be capable of controlling the additional memory coupled to the portable media using the flash memory type data for the additional memory.

In some implementations, the flash memory type data may be altered. For example, as a first memory is used, it may experience wear and have more bad blocks. The flash memory type data may be altered as a result. As another example, the flash memory type data includes the amount of memory available. This memory may correspond to the amount of memory as presented to a user for use. Thus, when a flash memory type data is altered because the amount of memory available for storage has been changed, the user may be presented this new amount of memory available. For example, when a number of bad blocks has increased and/or the amount of metadata needed (e.g., additional space required to store new bad block data, additional space required to perform operations, additional space required for error checking, etc.), the amount of available memory (e.g., for use by a user) is altered and when a user is presented the amount of available space on a memory, the new altered amount may be presented.

Although a user has been described as a human, a user may be a person, a group of people, a person or persons interacting with one or more computers, and/or a computer system, as appropriate.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer (e.g., host or external host) having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to interact with a user as well. For example, feedback provided to the user by an output device may be any form of sensory feedback (e.g., visual feedback, auditory feedback, and/or tactile feedback) and/or input from the user may be received in any form, including acoustic, speech, or tactile input.

The systems and techniques described here can be implemented in a computing system that includes a back end component (e.g., as a data server), a middleware component (e.g., an application server), a front end component (e.g., a client computer with a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and a server are generally remote from each other and typically interact through a communication network. The relationship of client and server arises by virtue of computer programs running on the respective computers and having a client-server relationship to each other.

What is claimed is:

1. A method comprising:
identifying a driver for a first nonvolatile memory stored in the first nonvolatile memory, the driver configurable to operate with each of a plurality of different types of nonvolatile memory;
retrieving data identifying type of nonvolatile memory of the first nonvolatile memory from a second nonvolatile memory separate from the first nonvolatile memory;
configuring the driver to manage the first nonvolatile memory using the nonvolatile-memory-type data retrieved from the second nonvolatile memory; and
executing an application stored on the first nonvolatile memory using the driver.

2. The method of claim 1, wherein the nonvolatile-memory-type data includes at least one of a manufacturer of the first nonvolatile memory, a size of the first nonvolatile memory, or a timing of the first nonvolatile memory.

3. The method of claim 1, further comprising storing an operating application for a host in the first nonvolatile memory, wherein the driver is incorporated in the operating application.

4. The method of claim 1 wherein the first nonvolatile memory comprises NAND flash memory.

5. The method of claim 1 wherein the second nonvolatile memory comprises NOR flash memory.

6. The method of claim 1 further comprising storing an operating application for a host in the first nonvolatile memory, wherein the host includes the first nonvolatile memory and the second nonvolatile memory.

7. The method of claim 1, further comprising:
exchanging the first nonvolatile memory with a third memory; and
storing flash memory type data for the third memory in the second nonvolatile memory.

8. A computer program product encoded on a non-transitory, tangible storage medium, the product comprising computer readable instructions for causing at least one processor to perform operations comprising:
identifying a driver for a first nonvolatile memory stored in the first nonvolatile memory, the driver configurable to operate with each of a plurality of different types of nonvolatile memory;
retrieving data identifying type of nonvolatile memory of the first nonvolatile memory from a second nonvolatile memory separate from the first nonvolatile memory; and
configuring the driver to manage the first nonvolatile memory using the nonvolatile-memory-type data retrieved from the second nonvolatile memory; and
executing an application stored on the first nonvolatile memory using the driver.

9. The computer program product of claim 8, wherein the nonvolatile-memory-type data includes at least one of a manufacturer of the first nonvolatile memory, a size of the first nonvolatile memory, or a timing of the first nonvolatile memory.

10. The computer program product of claim 8, further comprising storing an operating application for a host in the first nonvolatile memory, wherein the driver is incorporated in the operating application.

11. The computer program product of claim 8, wherein the first nonvolatile memory comprises NAND flash memory.

12. The computer program product of claim 8, wherein the second nonvolatile memory comprises NOR flash memory.

13. The computer program product of claim 8, further comprising storing an operating application for a host in the first nonvolatile memory, wherein the host includes the first nonvolatile memory and the second nonvolatile memory.

14. The computer program product of claim 8, further comprising:
exchanging the first nonvolatile memory with a third memory; and
storing flash memory type data for the third memory in the second nonvolatile memory.

15. A system comprising:
a first nonvolatile memory configured to enable sequential access to data stored on the first nonvolatile memory and store an application;
a second nonvolatile memory different from the first memory configured to enable random access to data stored on the second memory;
flash memory type data for the first memory stored in the second nonvolatile memory; and
a driver configured to control the first memory based at least partially on the flash memory type data and stored on the first memory and executing the application stored on the first nonvolatile memory.

16. The system of claim 15 further comprising a third memory and flash memory type data for the third memory, and wherein the driver is configured to control the third memory based at least partially on the flash memory type data for the third memory.

17. The system of claim 15, further comprising an operating application configured to manage a host device and stored in the first nonvolatile memory, wherein the driver is incorporated into the operating application.

* * * * *